(12) United States Patent
Liu et al.

(10) Patent No.: US 9,031,069 B2
(45) Date of Patent: May 12, 2015

(54) METHOD, SYSTEM, AND APPARATUS FOR EXTRANET NETWORKING OF MULTICAST VIRTUAL PRIVATE NETWORK

(75) Inventors: Yisong Liu, Beijing (CN); Haiyang Su, Beijing (CN); Zhong Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 13/174,063

(22) Filed: Jun. 30, 2011

(65) Prior Publication Data

US 2011/0255536 A1  Oct. 20, 2011

Related U.S. Application Data

(63) Continuation of application No. PCT/CN2009/076182, filed on Dec. 29, 2009.

(30) Foreign Application Priority Data

Dec. 31, 2008 (CN) .......................... 2008 1 0191759

(51) Int. Cl.
  *H04L 12/761* (2013.01)
  *H04L 12/46* (2006.01)
  *H04L 12/723* (2013.01)

(52) U.S. Cl.
  CPC ............ *H04L 45/16* (2013.01); *H04L 12/4641* (2013.01); *H04L 45/50* (2013.01)

(58) Field of Classification Search
  USPC ............ 370/390, 392, 395.3, 395.53; 726/15
  See application file for complete search history.

(56) References Cited

U.S. PATENT DOCUMENTS

| 7,154,889 B1 | 12/2006 | Rekhter et al. |
| 7,830,787 B1 * | 11/2010 | Wijnands et al. ............. 370/218 |
| 2006/0168047 A1 | 7/2006 | Li |
| 2006/0209831 A1 * | 9/2006 | Shepherd et al. ............. 370/392 |
| 2007/0147372 A1 | 6/2007 | Liu et al. |

(Continued)

FOREIGN PATENT DOCUMENTS

| CN | 1791054 A | 6/2006 |
| CN | 101013950 A | 8/2007 |

(Continued)

OTHER PUBLICATIONS

International Search Report in corresponding PCT Application No. PCT/CN2009/076182 (Apr. 8, 2010).

(Continued)

*Primary Examiner* — Brandon Renner
*Assistant Examiner* — Scott M Sciacca
(74) *Attorney, Agent, or Firm* — Leydig, Voit & Mayer, Ltd.

(57) ABSTRACT

A method, a system, and an apparatus for extranet networking of a multicast Virtual Private Network (VPN) are disclosed in the present invention. The method includes: establishing a multicast tunnel to a source VPN multicast instance and a multicast tunnel interface (MTI) connected to the multicast tunnel according to an added Share-Group address of a source VPN; sending an encapsulated Protocol Independent Multicast (PIM) protocol message to the MTI, forwarding the encapsulated PIM protocol message in a public network, and making the source VPN multicast instance generate a public network multicast data message of a Share-Group of the source VPN according to the encapsulated PIM protocol message; and decapsulating the received public network multicast data message of the Share-Group of the source VPN, and obtaining multicast data from the source VPN multicast instance. The present invention reduces the resource occupation of a router system, and alleviates the network load.

13 Claims, 7 Drawing Sheets

(56) References Cited

U.S. PATENT DOCUMENTS

| | | | |
|---|---|---|---|
| 2007/0177594 A1* | 8/2007 | Kompella | 370/390 |
| 2008/0101350 A1 | 5/2008 | Kreuk | |
| 2009/0070422 A1* | 3/2009 | Kashyap et al. | 709/204 |
| 2009/0086689 A1* | 4/2009 | Hunt et al. | 370/338 |
| 2010/0067528 A1* | 3/2010 | Napierala | 370/390 |
| 2012/0176934 A1* | 7/2012 | Farinacci et al. | 370/254 |

FOREIGN PATENT DOCUMENTS

| | | |
|---|---|---|
| CN | 101159659 A | 4/2008 |
| CN | 101217458 A | 7/2008 |
| CN | 101459606 A | 6/2009 |
| CN | 101459606 B | 4/2011 |

OTHER PUBLICATIONS

Written Opinion of the International Searching Authority in corresponding PCT Application No. PCT/CN2009/076182 (Apr. 8, 2010).

European Search Report in corresponding European Patent Application 09836058.9 (Jan. 4, 2013).

"Multicast VPN Technology White Paper," Hangzhou H3C Technologies Co., Ltd., 2008, Hangzhou, China.

* cited by examiner ferred in the private network, the private network multicast instance does not either need to learn multicast routing information in the public network instance, and private network multicast instances are isolated from each other.

If a VPN user needs to receive multicast data of other VPN users, a multicast VPN extranet networking solution may be used. The networking solution may be that, a source PE configures a receiver VPN multicast instance, and a Share-Group address of a receiver VPN is added to a newly configured receiver VPN multicast instance, a multicast tunnel from the newly configured receiver VPN multicast instance to the original receiver VPN multicast instance is established, and the original receiver VPN multicast instance and the newly configured receiver VPN multicast instance may communicate in an intranet manner; while on the source PE equipment, the newly configured receiver VPN multicast instance and the source VPN multicast instance realize an extranet in a local intersection manner, that is, communicate through an internal message between different VPN multicast instances on the same equipment, so as to complete the transfer of a Protocol Independent Multicast (PIM) protocol message and a multicast data message. A networking solution in the prior art may also be that, a receiver PE configures a source VPN multicast instance, a Share-Group address of an original source VPN is added to a newly configured source VPN multicast instance, a multicast tunnel from the newly configured source VPN multicast instance to the original source VPN multicast instance is established, and the newly configured source VPN multicast instance and the original source VPN multicast instance may communicate in an intranet manner; while on the receiver PE equipment, the newly configured source VPN multicast instance and the receiver VPN multicast instance realize an extranet in a local intersection manner, that is, communicate through an internal message between different VPN multicast instances on the same equipment, so as to complete the transfer of a PIM protocol message and a multicast data message.

In the implementation of the present invention, the inventor finds that at least the following problems exist in the prior art:

In the prior art, no matter whether the source PE configures the receiver VPN multicast instance, or the receiver PE configures the source VPN multicast instance, the multicast VPN extranet is realized through local private network intersection, and a multicast stream of a remote VPN site still uses a multicast tunnel of the same VPN. If the receiver VPN multicast instance needs to receive multicast data from a plurality of different source VPNs, the receiver PE needs to additionally configure a plurality of source VPN multicast instances, while the receiver PE may not have a service of the foregoing VPN instances, and the occupation of system resources on a receiver PE router is excessively large. The same problem occurs on the source PE configuring the receiver VPN multicast instance.

Additionally, if VPN multicast instances of a plurality of remote PEs for a multicast stream of the source VPN multicast instance need to be received, since each receiver VPN needs to transfer the multicast stream through its own multicast tunnel, a public network performs encapsulation and replication in a Share-Group multicast distribution tree of a plurality of receiver VPNs, and meanwhile a plurality of traffic is forwarded for a piece of multicast data, thereby increasing the network load.

SUMMARY OF THE INVENTION

Embodiments of the present invention provide a method, a system, and an apparatus for extranet networking of a multicast VPN, which alleviate the network load.

METHOD, SYSTEM, AND APPARATUS FOR EXTRANET NETWORKING OF MULTICAST VIRTUAL PRIVATE NETWORK

CROSS-REFERENCE TO RELATED APPLICATIONS

This application is a continuation of International Application No. PCT/CN2009/076182, filed on Dec. 29, 2009, which claims priority to Chinese Patent Application No. 200810191759.7, filed on Dec. 31, 2008, both of which are hereby incorporated by reference in their entireties.

FIELD OF THE INVENTION

The present invention relates to the field of communications technologies, and in particular, to a method, a system, and an apparatus for extranet networking of a multicast Virtual Private Network (VPN).

BACKGROUND OF THE INVENTION

Internet Protocol (IP) multicast refers to that in an IP network, a data packet is sent to a certain determined node subset in the network by using a best-effort scheme, and the node subset is referred to as a multicast group. A source host sends only one piece of data, a destination address in the piece of data is a multicast group address, all receivers in the multicast group may receive the same data copy, and only hosts in the multicast group may receive the data, while other hosts outside the multicast group cannot receive the data.

In dependence on a virtual dedicated communication network established in a public network by an Internet service provider (ISP) and a network service provider (NSP), a VPN may divide an existing IP network into logically isolated networks.

The VPN is formed of a customer edge (CE), a provider edge (PE), and a provider (P, namely, a service provider network backbone router). The CE is directly connected to a service provider (SP) network, exclusively belongs to a certain VPN, only serves the exclusive VPN, and only maintains a set of forwarding mechanism, and the CE may be a router or a switch, and may also be a host; the PE is directly connected to the CE, is also connected to a public network and a VPN network, and serves a plurality of VPNs simultaneously; and the P is not directly connected to the CE. The PE and the P are managed only by the SP, and the CE is managed only by a user, unless the customer entrusts the SP with the management right. A PE may be connected to a plurality of CEs, and a CE may also be connected to a plurality of PEs belonging to the same SP or different SPs. On the PE, information of each network must be strictly distinguished, and a set of forwarding mechanism is independently maintained for each network. A set of software/hardware apparatus serving the same network on the PE is collectively referred to as an instance, a plurality of instances may exist simultaneously on the PE, and the same instance may be distributed on a plurality of PEs.

A multicast VPN solution needs to support a multicast function in an SP backbone network (a core network or a public network), and multicast data and a control message in a private network instance are transferred to a remote site of the VPN through a public network. A multicast instance operated in a VPN instance on a PE router is referred to as a private network multicast instance, and a multicast instance operated by a public network part of the PE router is referred to as a public network multicast instance. The public network multicast instance does not need to learn multicast data trans- In an embodiment, the present invention provides a method for extranet networking of a multicast VPN, which includes:

establishing a multicast tunnel to a source VPN multicast instance and a multicast tunnel interface (MTI) connected to the multicast tunnel according to an added Share-Group address of a source VPN;

sending an encapsulated PIM protocol message to the MTI, forwarding the encapsulated PIM protocol message in a public network, and making the source VPN multicast instance generate a public network multicast data message of a Share-Group of the source VPN according to the encapsulated PIM protocol message; and decapsulating the received public network multicast data message of the Share-Group of the source VPN, and obtaining multicast data from the source VPN multicast instance.

In an embodiment, the present invention further provides a system for extranet networking of a multicast VPN, which includes a source VPN and a receiver VPN, where:

the receiver VPN is configured to establish a multicast tunnel to a source VPN multicast instance and an MTI connected to the multicast tunnel according to an added Share-Group address of a source VPN; send an encapsulated PIM protocol message to the MTI, forward the encapsulated PIM protocol message in a public network, and make the source VPN multicast instance generate a public network multicast data message of a Share-Group of the source VPN according to the encapsulated PIM protocol message; and decapsulate the received public network multicast data message of the Share-Group of the source VPN, and obtain multicast data from the source VPN multicast instance.

In an embodiment, the present invention further provides a receiver VPN multicast instance, which includes:

an establishing module, configured to establish a multicast tunnel to a source VPN multicast instance and an MTI connected with the multicast tunnel according to an added Share-Group address of a source VPN;

a sending module, configured to send an encapsulated PIM protocol message to the MTI established by the establishing module, forward the encapsulated PIM protocol message in a public network, and make the source VPN multicast instance generate a public network multicast data message of a Share-Group of the source VPN according to the encapsulated PIM protocol message; and an obtaining module, configured to decapsulate the received public network multicast data message of the Share-Group of the source VPN, and obtain multicast data from the source VPN multicast instance.

The technical solutions of the present invention have the following advantages: Because the Share-Group address of the source VPN is added to the receiver VPN multicast instance, and the multicast tunnel from the receiver VPN multicast instance to the source VPN multicast instance is established, the resource occupation of a router system is reduced, and the network load is alleviated.

BRIEF DESCRIPTION OF THE DRAWINGS

To illustrate the technical solutions according to the embodiments of the present invention or in the prior art more clearly, the accompanying drawings for describing the present invention or the prior art are introduced briefly in the following. Apparently, the accompanying drawings in the following description are only some embodiments of the present invention, and person of ordinary skill in the art can derive other drawings from the accompanying drawings without creative efforts.

DETAILED DESCRIPTION OF THE EMBODIMENTS

According to the embodiments of the present invention, no VPN instance is additionally configured, and a Share-Group address of a source VPN is added to a receiver VPN multicast instance, so that a PIM protocol message of a receiver VPN may reach the remote source VPN, and a multicast data message of the source VPN may also reach the remote receiver VPN.

The technical solutions according to the embodiments of the present invention are clearly described in detail in the following with reference to the accompanying drawings. It is evident that the embodiments to be described are only a part of rather than all of the embodiments of the present invention. All other embodiments obtained by persons of ordinary skill in the art based on the embodiments of the present invention without creative efforts shall fall within the protection scope of the present invention.

Figure 1:
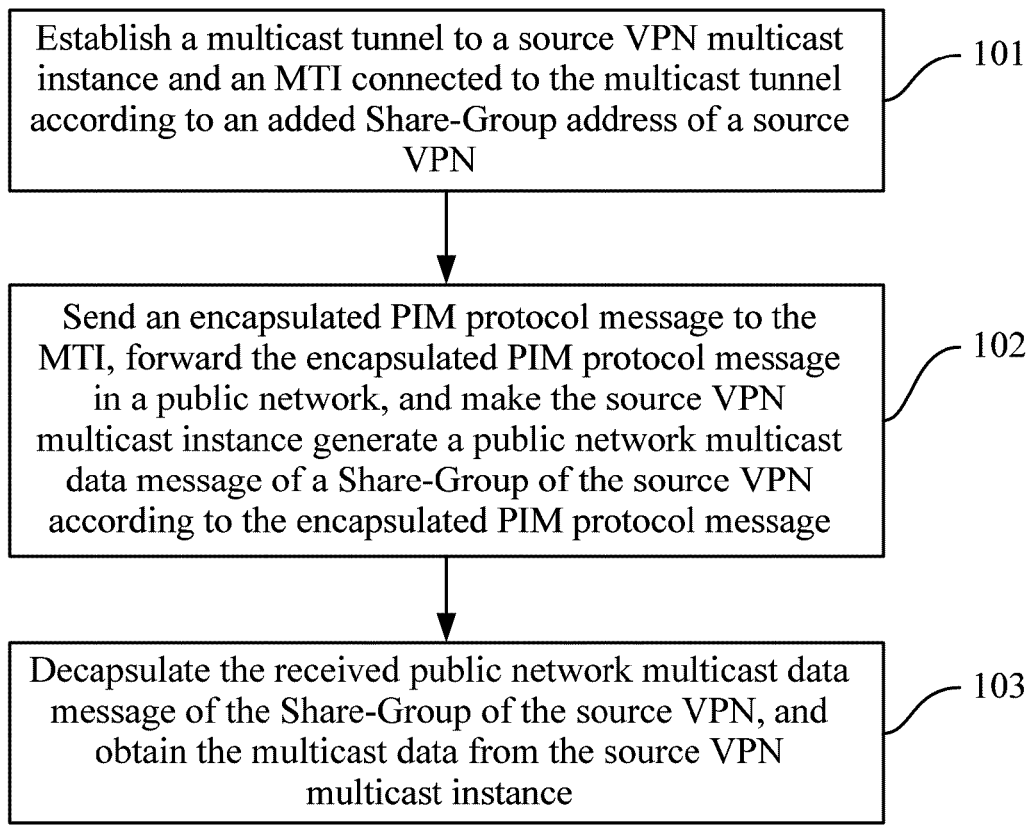
FIG. 1 is a flow chart of a method for extranet networking of a multicast VPN according to an embodiment of the present invention.

FIG. 1 is a flow chart of a method for extranet networking of a multicast VPN according to an embodiment of the present invention, which includes the following steps:

Step 101: Establish a multicast tunnel to a source VPN multicast instance and an MTI connected to the multicast tunnel according to an added Share-Group address of a source VPN.

In the embodiment of the present invention, a VPN instance providing a multicast data source is referred to as a source VPN multicast instance, and a PE router where the source VPN multicast instance is located is referred to as a source PE; and a VPN instance in need of receiving the multicast data is referred to as a receiver VPN multicast instance, and is not located at the same VPN as the source VPN multicast instance, and a PE router where the receiver VPN multicast instance is located is referred to as a receiver PE. After the Share-Group address of the source VPN is added to the source VPN multicast instance at the source PE side, the Share-Group address of the source VPN is also added to the receiver VPN multicast instance, and the multicast tunnel from the receiver VPN multicast instance to the source VPN multicast instance and the MTI connected to the multicast tunnel are established.

After the Share-Group address of the source VPN is added to the receiver VPN multicast instance, a forwarding range of the multicast data of the source VPN multicast instance is specified. When both the receiver VPN multicast instance and the source VPN multicast instance operate in a PIM Sparse Mode (SM), the specified forwarding range of the multicast data of the source VPN multicast instance is a private network group address range; and when both the receiver VPN multicast instance and the source VPN multicast instance operate in a PIM Source Specific Multicast (SSM), the specified forwarding range of the multicast data of the source VPN multicast instance is a private network source group address range. According to the embodiment of the present invention, forwarding ranges of extranet multicast data of different source VPNs may be specified in such forms as (Share-Group, private network group address/mask), [Share-Group, (private network source address/mask, private network group address/mask)], and [Share-Group, (discrete group address set)].

Step 102: Send an encapsulated PIM protocol message to the MTI, forward the encapsulated PIM protocol message in a public network, and make the source VPN multicast instance generate a public network multicast data message of a Share-Group of the source VPN according to the encapsulated PIM protocol message.

Before the receiver VPN multicast instance sends the encapsulated PIM protocol message to a remote PE, the MTI to which the encapsulated PIM protocol message is sent needs to be determined according to a private network group address or a source group address, a PIM protocol message of the receiver VPN multicast instance is encapsulated into the encapsulated PIM protocol message of a Share-Group according to the Share-Group corresponding to the MTI, and the encapsulated PIM protocol message is forwarded in the public network through a public network multicast instance. The source VPN multicast instance decapsulates the encapsulated PIM protocol message forwarded in the public network, and obtains the PIM protocol message of the receiver VPN multicast instance; and after obtaining the PIM protocol message of the receiver VPN multicast instance, the source VPN multicast instance encapsulates the multicast data of the source VPN according to the PIM protocol message, and sends the public network multicast data message encapsulated with the multicast data of the source VPN to the receiver VPN multicast instance through the public network.

Step 103: Decapsulate the received public network multicast data message of the Share-Group of the source VPN, and obtain the multicast data from the source VPN multicast instance.

The source VPN multicast instance obtains the PIM protocol message, encapsulates the multicast data into the public network multicast data message of the Share-Group of the source VPN according to the PIM protocol message, and forwards the encapsulated multicast data in the public network through the public network multicast instance. The receiver VPN multicast instance receives the encapsulated multicast data, decapsulates the encapsulated multicast data, and obtains the multicast data, thereby realizing the extranet networking of the multicast VPN.

It is checked whether a group address or a source group address of the multicast data is in the specified forwarding range of the multicast data of the source VPN multicast instance after the receiver VPN multicast instance obtains the multicast data from the source VPN multicast instance. The multicast data is forwarded according to receiver VPN multicast routing if the group address or the source group address of the multicast data is in the specified forwarding range of the multicast data of the source VPN multicast instance; and the multicast data is discarded if the group address or the source group address of the multicast data is not in the specified forwarding range of the multicast data of the source VPN multicast instance.

The embodiment of the present invention ensures isolation between VPN multicast instances. As for receiver VPN multicast instances, multicast forwarding of a remote site of a current VPN and remote sites of other source VPNs is performed through their respective different multicast tunnels of the receiver VPN multicast instances, no communication exists between the multicast tunnels, and an MTI created by each of multicast tunnels is used for sending a multicast protocol message and receiving a multicast data message; and as for the source VPN multicast instance, each receiver VPN multicast instance establishes a multicast tunnel to the source VPN, only an address space of the source VPN used for extranet forwarding is visible, and other address spaces of each VPN multicast instance are still isolated, that is, an intranet address space of the source VPN multicast instance is invisible to each receiver VPN, and the intranet address space and other extranet address spaces of all receiver VPN instances are also invisible to each other.

The technical solution according to the embodiment of the present invention has the following advantages: Because the Share-Group address of the source VPN is added to the receiver VPN multicast instance, and the multicast tunnel from the receiver VPN multicast instance to the source VPN multicast instance is established, the resource occupation of a router system is reduced, and the network load is alleviated.

Figure 2A:
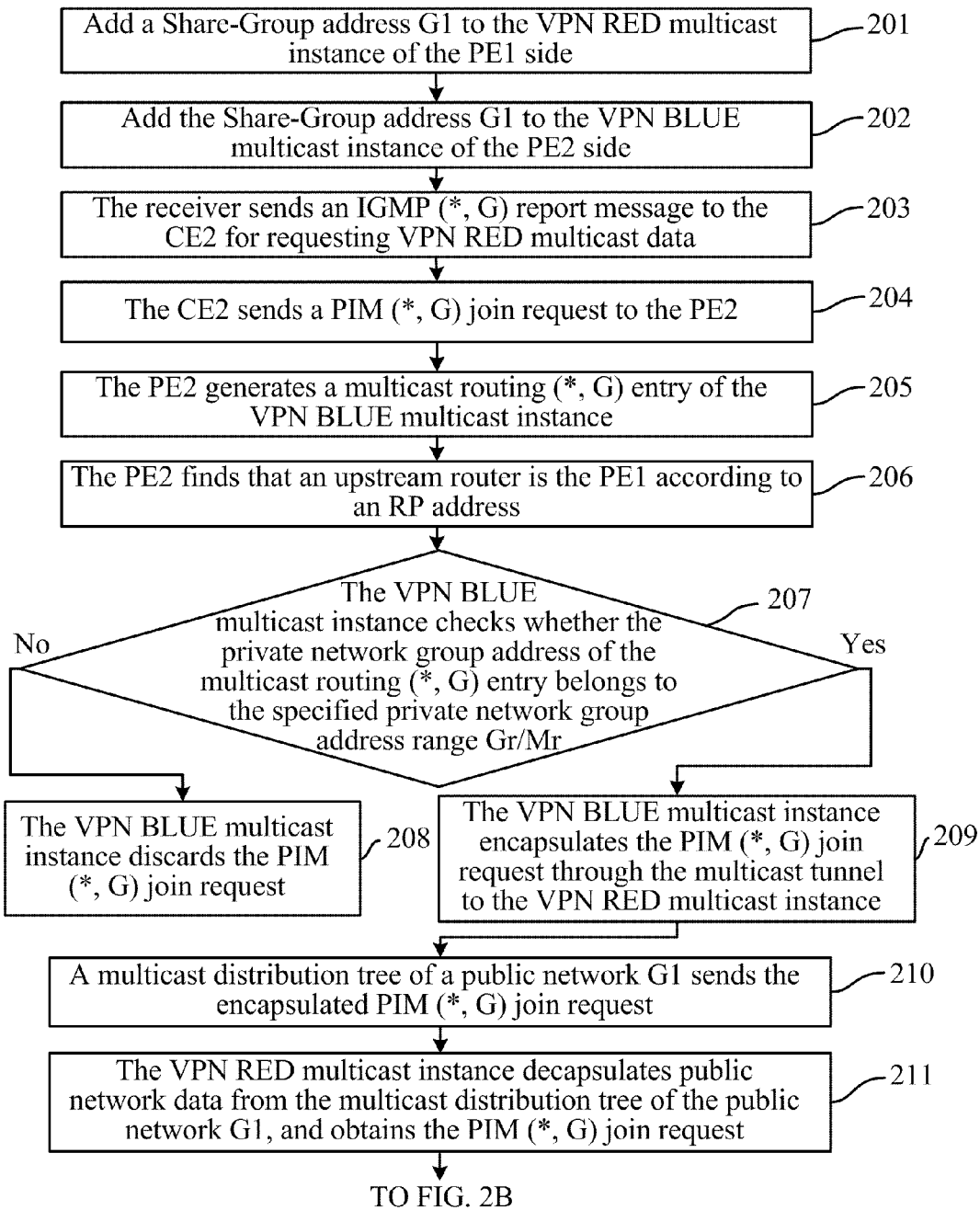
FIG. 2A and FIG. 2B are a flow chart of another method for extranet networking of a multicast VPN according to an embodiment of the present invention.
Figure 2B:
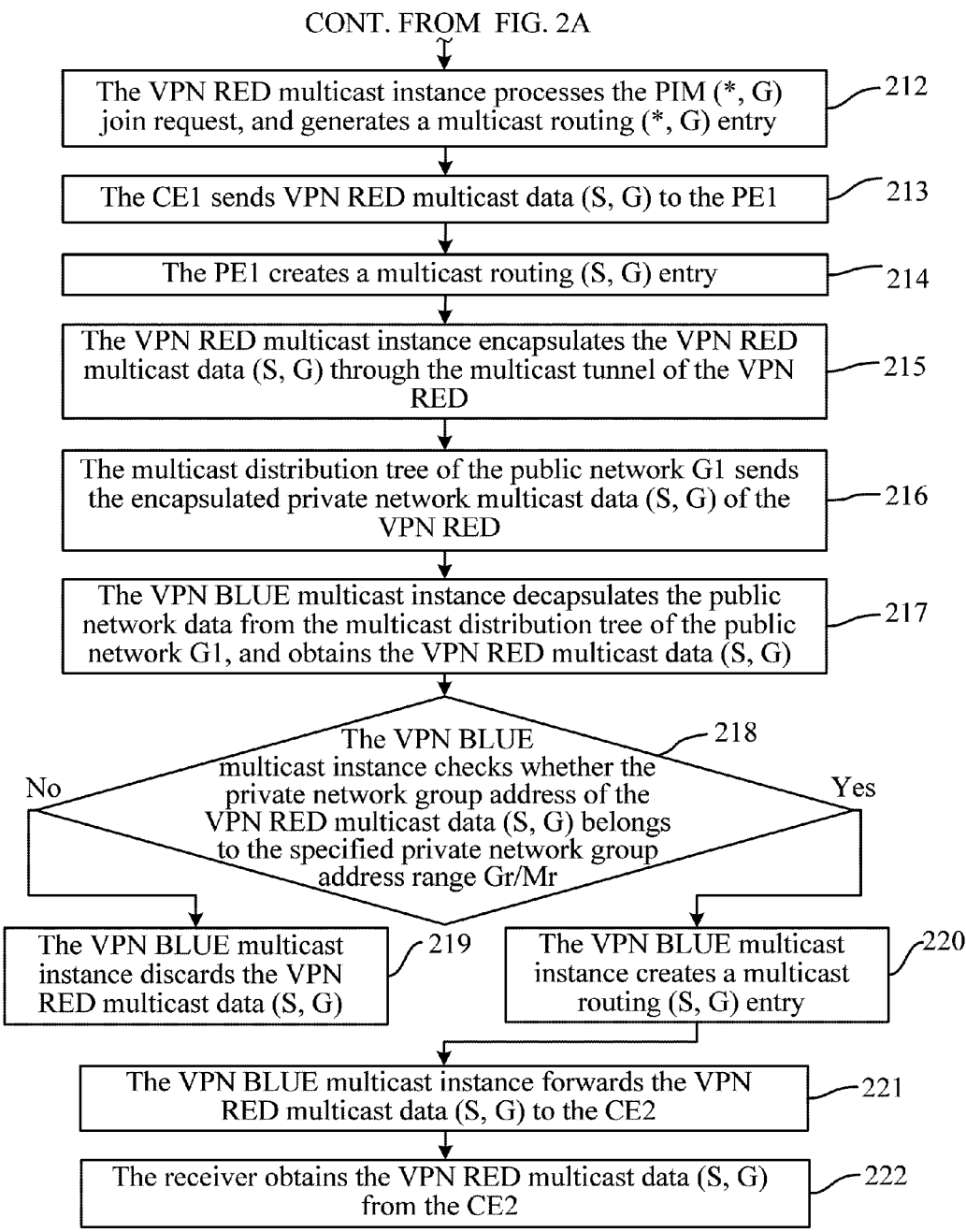
Figure 3:
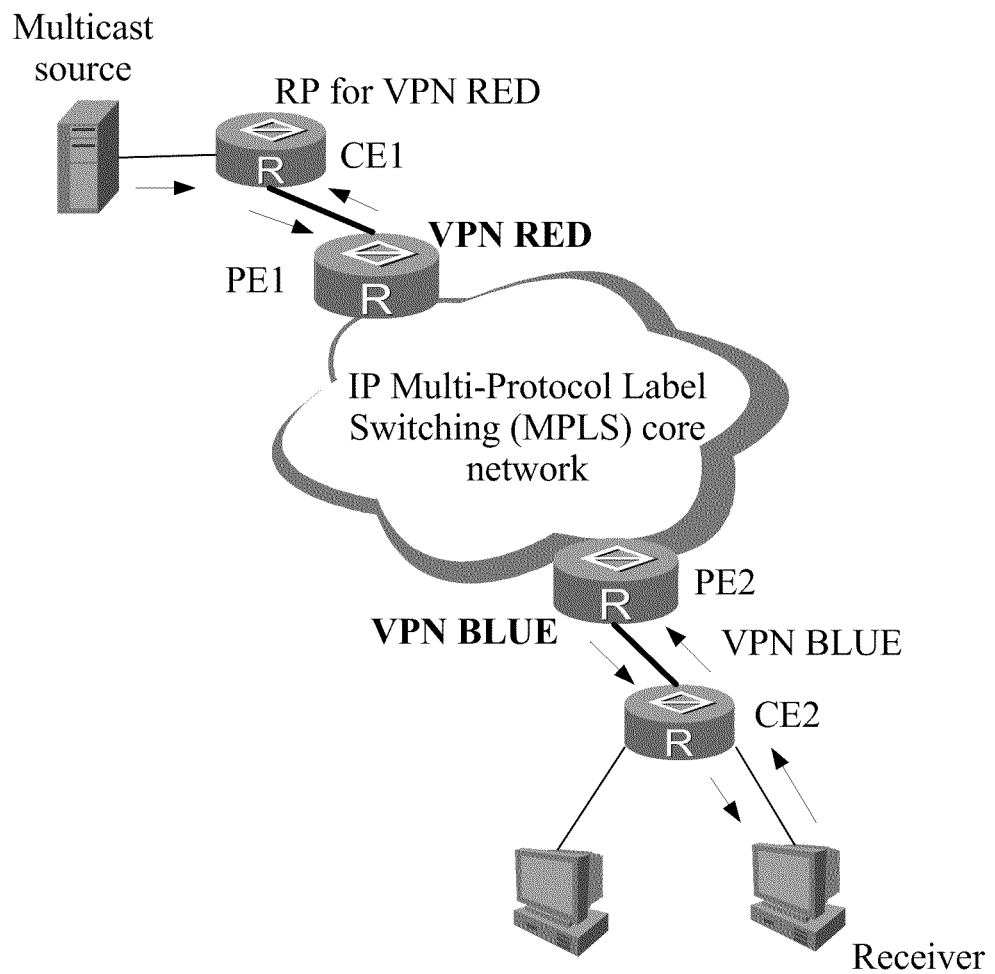
FIG. 3 is a schematic diagram showing networking of a method for extranet networking according to an embodiment of the present invention.

FIG. 2A and FIG. 2B are a flow chart of another method for extranet networking of a multicast VPN according to an embodiment of the present invention. In this embodiment, the method for extranet networking of a multicast VPN is applied to networking as shown in FIG. 3, in which PE1 is a PE router where a VPN RED multicast instance is located, PE2 is a PE router where a VPN BLUE multicast instance is located, CE1 is connected to a multicast source, and CE2 is connected to a receiver. The method for extranet networking of a multicast VPN includes the following steps:

Step 201: Add a Share-Group address G1 to the VPN RED multicast instance of the PE1 side.

The VPN RED multicast instance is a VPN instance providing a multicast data source, and the PE1 is a PE router where the VPN RED multicast instance is located. After added with the Share-Group address G1, the VPN RED multicast instance can perform data transmission with a public network.

Step 202: Add the Share-Group address G1 to the VPN BLUE multicast instance of the PE2 side.

The VPN BLUE multicast instance is a VPN instance in need of receiving the multicast data, and is not located at the same VPN as the VPN RED multicast instance, and the PE2 is a PE router where the VPN BLUE multicast instance is located. After added with the Share-Group address G1, the VPN BLUE multicast instance specifies a private network group address range Gr/Mr, establishes a multicast tunnel from the VPN BLUE multicast instance to the VPN RED multicast instance, and can perform data transmission with the public network.

In the embodiment of the present invention, the CE1 is connected to the multicast source, the CE2 is connected to the receiver; both the VPN RED multicast instance and the VPN BLUE multicast instance operate in a PIM SM; a Rendezvous Point (RP) of the VPN RED is configured at the CE1, and the CE2 is directly connected to an interface of the receiver to enable the Internet Group Management Protocol (IGMP). The VPN BLUE multicast instance is added with the Share-Group address G1, and specifies the private network group address range Gr/Mr at the same time. The VPN BLUE multicast instance may be further added with a Share-Group address G2 of the current VPN, for receiving multicast data of a remote site of the current VPN.

Step 203: The receiver sends an IGMP (*, G) report message to the CE2 for requesting VPN RED multicast data.

A private network group address of the IGMP (*, G) report message is G, and a private network source address of the message is vacant.

Step 204: The CE2 sends a PIM (*, G) join request to the PE2.

The PIM (*, G) join request is a PIM protocol message, a private network group address of the message is G, and a private network source address of the message is vacant.

Step 205: The PE2 generates a multicast routing (*, G) entry of the VPN BLUE multicast instance.

A private network group address of the multicast routing (*, G) entry is G, and a private network source address of the multicast routing (*, G) entry is vacant.

Step 206: The PE2 finds that an upstream router is the PE1 according to an RP address.

Step 207: The VPN BLUE multicast instance checks whether the private network group address of the multicast routing (*, G) entry belongs to the specified private network group address range Gr/Mr.

If the private network group address of the multicast routing (*, G) entry belongs to the Gr/Mr, step 209 is performed; and if the private network group address of the multicast routing (*, G) entry does not belong to the Gr/Mr, step 208 is performed.

Step 208: The VPN BLUE multicast instance discards the PIM (*, G) join request.

Step 209: The VPN BLUE multicast instance encapsulates the PIM (*, G) join request through the multicast tunnel to the VPN RED multicast instance.

Step 210: A multicast distribution tree of a public network G1 sends the encapsulated PIM (*, G) join request.

Step 211: The VPN RED multicast instance decapsulates public network data from the multicast distribution tree of the public network G1, and obtains the PIM (*, G) join request.

Step 212: The VPN RED multicast instance processes the PIM (*, G) join request, and generates a multicast routing (*, G) entry.

Step 213: The CE1 sends VPN RED multicast data (S, G) to the PE1.

A private network group address of the VPN RED multicast data is G, and a private network source address of the VPN RED multicast data is S.

Step 214: The PE1 creates a multicast routing (S, G) entry.

A private network group address of the multicast routing (S, G) entry is G, and a private network source address of the multicast routing (S, G) entry is S.

Step 215: The VPN RED multicast instance encapsulates the VPN RED multicast data (S, G) through the multicast tunnel of the VPN RED.

Step 216: The multicast distribution tree of the public network G1 sends the encapsulated private network multicast data (S, G) of the VPN RED.

Step 217: The VPN BLUE multicast instance decapsulates the public network data from the multicast distribution tree of the public network G1, and obtains the VPN RED multicast data (S, G).

Step 218: The VPN BLUE multicast instance checks whether the private network group address of the VPN RED multicast data (S, G) belongs to the specified private network group address range Gr/Mr.

If the private network group address of the VPN RED multicast data (S, G) belongs to the specified private network group address range Gr/Mr, step 220 is performed; and if the private network group address of the VPN RED multicast data (S, G) does not belong to the specified private network group address range Gr/Mr, step 219 is performed.

Step 219: The VPN BLUE multicast instance discards the VPN RED multicast data (S, G).

Step 220: The VPN BLUE multicast instance creates a multicast routing (S, G) entry.

Step 221: The VPN BLUE multicast instance forwards the VPN RED multicast data (S, G) to the CE2.

Step 222: The receiver obtains the VPN RED multicast data (S, G) from the CE2.

The technical solution according to the embodiment of the present invention has the following advantages: Because the Share-Group address of the source VPN is added to the receiver VPN multicast instance, the multicast tunnel from the receiver VPN multicast instance to the source VPN multicast instance is established, and it is checked whether the private network group address of the received multicast data belongs to the specified private network group address range, the isolation between the VPN multicast instances is ensured, the resource occupation of a router system is reduced, and the network load is alleviated.

Figure 4A:
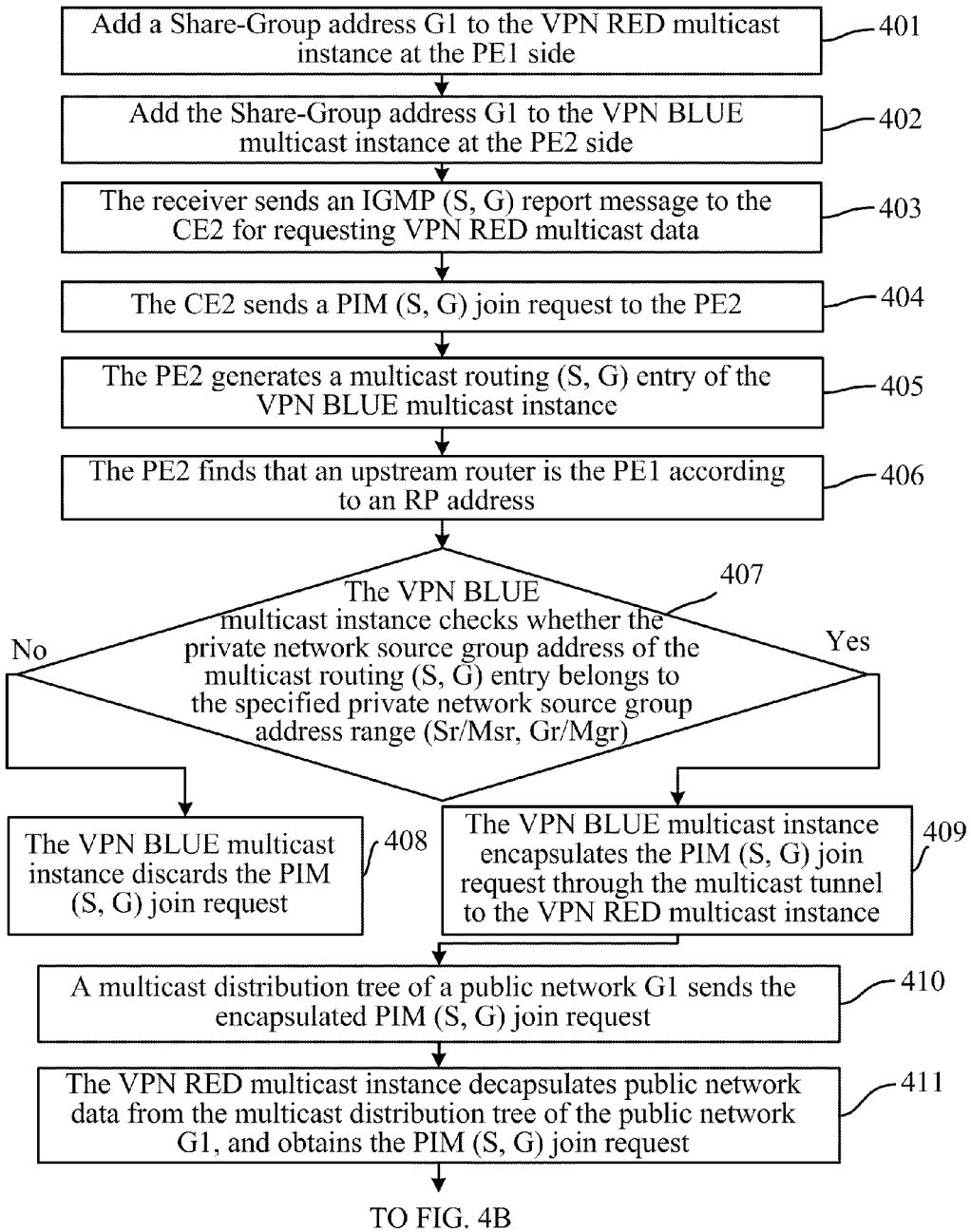
FIG. 4A and FIG. 4B are a flow chart of another method for extranet networking of a multicast VPN according to an embodiment of the present invention.
Figure 4B:
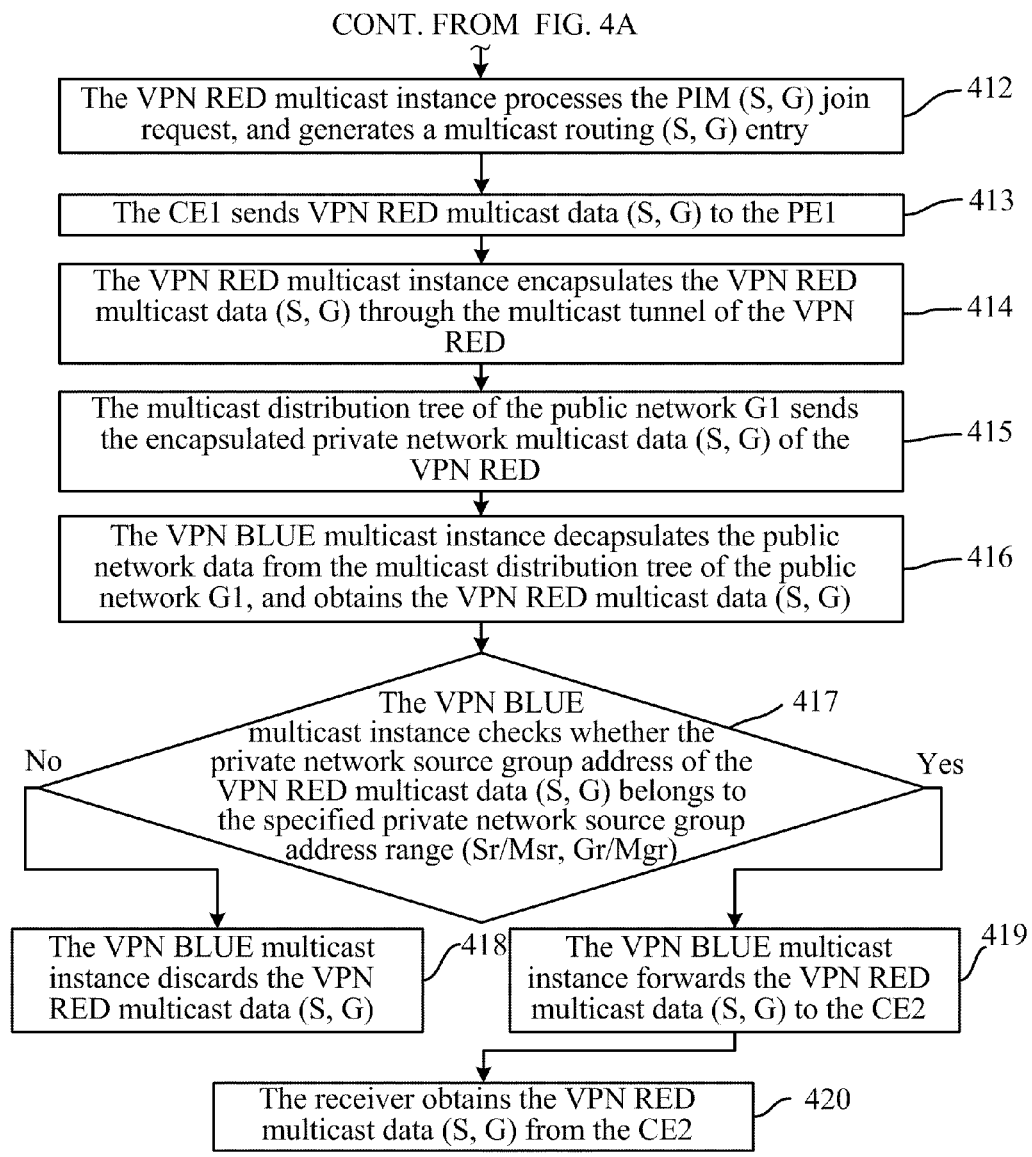

FIG. 4A and FIG. 4B are a flow chart of another method for extranet networking of a multicast VPN according to an embodiment of the present invention. In this embodiment, the method for extranet networking of a multicast VPN is applied to networking as shown in FIG. 3, in which PE1 is a PE router where a VPN RED multicast instance is located, PE2 is a PE router where a VPN BLUE multicast instance is located, CE1 is connected to a multicast source, and CE2 is connected to a receiver. The method for extranet networking of a multicast VPN includes the following steps:

Step 401: Add a Share-Group address G1 to the VPN RED multicast instance at the PE1 side.

The VPN RED multicast instance is a VPN instance providing a multicast data source, and the PE1 is a PE router where the VPN RED multicast instance is located. After added with the Share-Group address G1, the VPN RED multicast instance can perform data transmission with a public network.

Step 402: Add the Share-Group address G1 to the VPN BLUE multicast instance at the PE2 side.

The VPN BLUE multicast instance is a VPN instance in need of receiving the multicast data, and is not located at the same VPN as the VPN RED multicast instance, and the PE2 is a PE router where the VPN BLUE multicast instance is located. The VPN BLUE multicast instance is added with the Share-Group address G1, specifies a private network source group address range (Sr/Msr, Gr/Mgr), establishes a multicast tunnel from the VPN BLUE multicast instance to the VPN RED multicast instance, and can perform data transmission with the public network.

In the embodiment of the present invention, the CE1 is connected to the multicast source, the CE2 is connected to the receiver, both the VPN RED multicast instance and the VPN BLUE multicast instance operate in a PIM SSM, and the CE2 is directly connected to an interface of the receiver to enable the IGMP. The VPN BLUE multicast instance is added with the Share-Group address G1, and specifies the private network source group address range (Sr/Msr, Gr/Mgr) at the same time. The VPN BLUE multicast instance may be further added with a Share-Group address G2 of the current VPN, for receiving multicast data of a remote site of the current VPN.

Step 403: The receiver sends an IGMP (S, G) report message to the CE2 for requesting VPN RED multicast data.

A private network group address of the IGMP (S, G) report message is G, and a private network source address of the IGMP (S, G) report message is S.

Step 404: The CE2 sends a PIM (S, G) join request to the PE2.

The PIM (S, G) join request is a PIM protocol message, a private network group address of the message is G, and a private network source address of the message is S.

Step 405: The PE2 generates a multicast routing (S, G) entry of the VPN BLUE multicast instance.

A private network group address of the multicast routing (S, G) entry is G, and a private network source address of the multicast routing (S, G) entry is S.

Step 406: The PE2 finds that an upstream router is the PE1 according to the private network source address.

Step 407: The VPN BLUE multicast instance checks whether the private network source group address of the multicast routing (S, G) entry belongs to the specified private network source group address range (Sr/Msr, Gr/Mgr).

If the private network source group address of the multicast routing (S, G) entry belongs to the (Sr/Msr, Gr/Mgr), step 409 is performed; and if the private network source group address of the multicast routing (S, G) entry does not belong to the (Sr/Msr, Gr/Mgr), step 408 is performed.

Step 408: The VPN BLUE multicast instance discards the PIM (S, G) join request.

Step 409: The VPN BLUE multicast instance encapsulates the PIM (S, G) join request through the multicast tunnel to the VPN RED multicast instance.

Step 410: A multicast distribution tree of a public network G1 sends the encapsulated PIM (S, G) join request.

Step 411: The VPN RED multicast instance decapsulates public network data from the multicast distribution tree of the public network G1, and obtains the PIM (S, G) join request.

Step 412: The VPN RED multicast instance processes the PIM (S, G) join request, and generates a multicast routing (S, G) entry.

Step 413: The CE1 sends VPN RED multicast data (S, G) to the PE1.

A private network group address of the VPN RED multicast data is G, and a private network source address of the VPN RED multicast data is S.

Step 414: The VPN RED multicast instance encapsulates the VPN RED multicast data (S, G) through the multicast tunnel of the VPN RED.

Step 415: The multicast distribution tree of the public network G1 sends the encapsulated private network multicast data (S, G) of the VPN RED.

Step 416: The VPN BLUE multicast instance decapsulates the public network data from the multicast distribution tree of the public network G1, and obtains the VPN RED multicast data (S, G).

Step 417: The VPN BLUE multicast instance checks whether the private network source group address of the VPN RED multicast data (S, G) belongs to the specified private network source group address range (Sr/Msr, Gr/Mgr).

If the private network group address of the VPN RED multicast data (S, G) belongs to the specified private network source group address range (Sr/Msr, Gr/Mgr), step 419 is performed; and if the private network source group address of the VPN RED multicast data (S, G) does not belong to the specified private network source group address range (Sr/Msr, Gr/Mgr), step 418 is performed.

Step 418: The VPN BLUE multicast instance discards the VPN RED multicast data (S, G).

Step 419: The VPN BLUE multicast instance forwards the VPN RED multicast data (S, G) to the CE2.

Step 420: The receiver obtains the VPN RED multicast data (S, G) from the CE2.

The technical solution according to the embodiment of the present invention has the following advantages: Because the Share-Group address of the source VPN is added to the receiver VPN multicast instance, the multicast tunnel from the receiver VPN multicast instance to the source VPN multicast instance is established, and it is checked whether the private network source group address of the received multicast data belongs to the specified private network source group address range, the isolation between the VPN multicast instances is ensured, the resource occupation of a router system is reduced, and the network load is alleviated.

In an embodiment, the present invention further provides a system for extranet networking of a multicast VPN, which includes a source VPN and a receiver VPN, where: the receiver VPN is configured to establish a multicast tunnel to a source VPN multicast instance and an MTI connected to the multicast tunnel according to an added Share-Group address of a source VPN; send an encapsulated PIM protocol message to the MTI, forward the encapsulated PIM protocol message in a public network, and make the source VPN multicast instance generate a public network multicast data message of a Share-Group of the source VPN according to the encapsulated PIM protocol message; and decapsulate the received public network multicast data message of the Share-Group of the source VPN, and obtain multicast data from the source VPN multicast instance.

Figure 5:
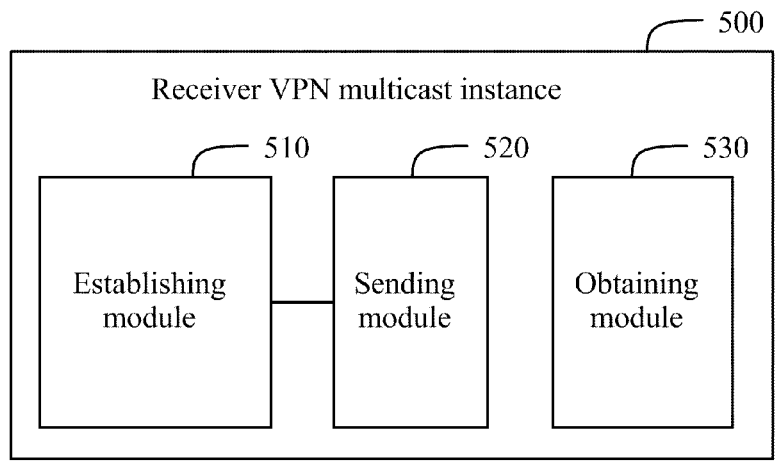
FIG. 5 is a schematic structural diagram of a receiver VPN multicast instance according to an embodiment of the present invention.

FIG. 5 is a schematic structural diagram of a receiver VPN multicast instance according to an embodiment of the present invention. The receiver VPN multicast instance 500 includes an establishing module 510, a sending module 520, and an obtaining module 530.

The establishing module 510 is configured to establish a multicast tunnel to a source VPN multicast instance and an MTI connected to the multicast tunnel according to an added Share-Group address of a source VPN.

In the embodiment of the present invention, a VPN instance providing a multicast data source is referred to as a source VPN multicast instance, and a PE router where the source VPN multicast instance is located is referred to as a source PE; and a VPN instance in need of receiving the multicast data is referred to as a receiver VPN multicast instance, and is not located at the same VPN as the source VPN multicast instance, and a PE router where the receiver VPN multicast instance is located is referred to as a receiver PE.

After the Share-Group address of the source VPN is added to the source VPN multicast instance at the source PE side, the Share-Group address of the source VPN is also added to the establishing module 510 of the receiver VPN multicast instance, and the multicast tunnel from the receiver VPN multicast instance to the source VPN multicast instance and the MTI connected to the multicast tunnel are established.

The sending module 520 is configured to send an encapsulated PIM protocol message to the MTI established by the establishing module 510, forward the encapsulated PIM protocol message in a public network, and make the source VPN multicast instance generate a public network multicast data message of a Share-Group of the source VPN according to the encapsulated PIM protocol message.

When the sending module 520 sends the encapsulated PIM protocol message to a remote PE, the MTI to which the encapsulated PIM protocol message is sent needs to be determined according to a private network group address or a source group address, a PIM protocol message of the receiver VPN multicast instance is encapsulated into the encapsulated PIM protocol message of the Share-Group according to the Share-Group corresponding to the MTI, and the encapsulated PIM protocol message is forwarded in a public network through a public network multicast instance. The source VPN multicast instance decapsulates the encapsulated PIM protocol message forwarded in the public network, and obtains the PIM protocol message of the receiver VPN multicast instance; and after obtaining the PIM protocol message of the receiver VPN multicast instance, the source VPN multicast instance encapsulates the multicast data of the source VPN according to the PIM protocol message, and sends the public network multicast data message encapsulated with the multicast data of the source VPN to the receiver VPN multicast instance through the public network.

The obtaining module 530 is configured to decapsulate the received public network multicast data message of the Share-Group of the source VPN, and obtain the multicast data from the source VPN multicast instance.

The source VPN multicast instance obtains the PIM protocol message, encapsulates the multicast data into the public network multicast data message of the Share-Group of the source VPN according to the PIM protocol message, and forwards the encapsulated multicast data in the public network through the public network multicast instance. The obtaining module 530 receives the encapsulated multicast data, decapsulates the encapsulated multicast data, and obtains the multicast data, thereby realizing the extranet networking of the multicast VPN.

The embodiment of the present invention ensures isolation between VPN multicast instances. As for receiver VPN multicast instances, multicast forwarding of a remote site of a current VPN and remote sites of other source VPNs is performed through their respective different multicast tunnels of the receiver VPN multicast instance, no communication exists between the multicast tunnels, and an MTI created by each of multicast tunnels is used for sending a multicast protocol message and receiving a multicast data message; and as for the source VPN multicast instance, each receiver VPN multicast instance establishes a multicast tunnel to the source VPN, only an address space of the source VPN used for extranet forwarding is visible, and other address spaces of each VPN multicast instance are still isolated, that is, an intranet address space of the source VPN multicast instance is invisible to each receiver VPN, and the intranet address space and other extranet address spaces of all receiver VPN instances are also invisible to each other.

The technical solution according to the embodiment of the present invention has the following advantages. Since the Share-Group address of the source VPN is added to the receiver VPN multicast instance, and the multicast tunnel from the receiver VPN multicast instance to the source VPN multicast instance is established, the resource occupation of a router system is reduced, and the network load is alleviated.

Figure 6:
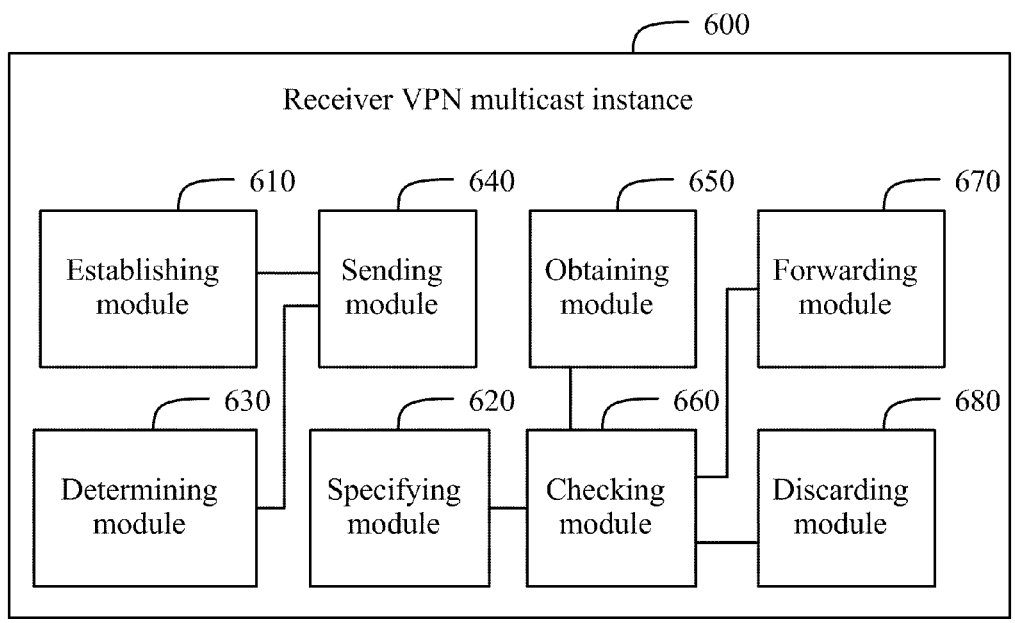
FIG. 6 is a schematic structural diagram of another receiver VPN multicast instance according to an embodiment of the present invention.

FIG. 6 is a schematic structural diagram of another receiver VPN multicast instance according to an embodiment of the present invention. The receiver VPN multicast instance 600 includes an establishing module 610, a specifying module 620, a determining module 630, a sending module 640, an obtaining module 650, a checking module 660, a forwarding module 670, and a discarding module 680.

The establishing module 610 is configured to establish a multicast tunnel to a source VPN multicast instance and an MTI connected to the multicast tunnel according to an added Share-Group address of a source VPN.

In the embodiment of the present invention, a VPN instance providing a multicast data source is referred to as a source VPN multicast instance, and a PE router where the source VPN multicast instance is located is referred to as a source PE; and a VPN instance in need of receiving the multicast data is referred to as a receiver VPN multicast instance, and is not located at the same VPN as the source VPN multicast instance, and a PE router where the receiver VPN multicast instance is located is referred to as a receiver PE.

After the Share-Group address of the source VPN is added to the source VPN multicast instance of the source PE side, the Share-Group address of the source VPN is also added to the establishing module 610 of the receiver VPN multicast instance, and the multicast tunnel from the receiver VPN multicast instance to the source VPN multicast instance, and the MTI connected to the multicast tunnel are established.

The specifying module 620 is configured to specify a forwarding range of the multicast data of the source VPN multicast instance.

The specifying module 620 specifies the forwarding range of the multicast data of the source VPN multicast instance, and when both the receiver VPN multicast instance and the source VPN multicast instance operate in a PIM SM, the specified forwarding range of the multicast data of the source VPN multicast instance is a private network group address range; when both the receiver VPN multicast instance and the source VPN multicast instance operate in a PIM SSM, the specified forwarding range of the multicast data of the source VPN multicast instance is a private network source group address range. According to the embodiment of the present invention, forwarding ranges of extranet multicast data of different source VPNs may be specified in such forms as (Share-Group, private network group address/mask), [Share-Group, (private network source address/mask, private network group address/mask)], and [Share-Group, (discrete group address set)].

The determining module 630 is configured to determine the MTI to which the sending module 640 sends the PIM protocol message according to a private network group address or a source group address.

The sending module 640 is configured to send an encapsulated PIM protocol message to the MTI established by the establishing module 610, forward the encapsulated PIM protocol message in a public network, and make the source VPN multicast instance generate a public network multicast data message of a Share-Group of the source VPN according to the encapsulated PIM protocol message.

The sending module 640 encapsulates the PIM protocol message into the encapsulated PIM protocol message of the Share-Group according to the Share-Group corresponding to the MTI, and forward the encapsulated PIM protocol message in a public network through a public network multicast instance. The source VPN multicast instance decapsulates the encapsulated PIM protocol message forwarded in the public network, and obtains the PIM protocol message.

The obtaining module 650 is configured to decapsulate the received public network multicast data message of the Share-Group of the source VPN, and obtain the multicast data from the source VPN multicast instance.

The source VPN multicast instance obtains the PIM protocol message, encapsulates the multicast data into the public network multicast data message of the Share-Group of the source VPN according to the PIM protocol message, and forwards the encapsulated multicast data in the public network through the public network multicast instance. The obtaining module 650 receives the encapsulated multicast data, decapsulates the encapsulated multicast data, and obtains the multicast data.

The checking module 660 is configured to check whether a group address or a source group address of the multicast data obtained by the obtaining module 650 is in the specified forwarding range of the multicast data of the source VPN multicast instance.

The checking module 660 checks whether the group address or the source group address of the multicast data obtained by the obtaining module 650 is in the specified forwarding range of the multicast data of the source VPN multicast instance. The multicast data is forwarded according to receiver VPN multicast routing if the group address or the source group address of the multicast data is in the specified forwarding range of the multicast data of the source VPN multicast instance; and the multicast data is discarded if the group address or the source group address of the multicast data is not in the specified forwarding range of the multicast data of the source VPN multicast instance.

The forwarding module 670 is configured to forward the multicast data according to the receiver VPN multicast routing if the checking module 660 checks that the group address or the source group address of the multicast data is in the specified forwarding range of the multicast data of the source VPN multicast instance.

The discarding module 680 is configured to discard the multicast data if the checking module 660 checks that the group address or the source group address of the multicast data is not in the specified forwarding range of the multicast data of the source VPN multicast instance.

The technical solution according to the embodiment of the present invention has the following advantages: Because the Share-Group address of the source VPN is added to the receiver VPN multicast instance, the multicast tunnel from the receiver VPN multicast instance to the source VPN multicast instance is established, and it is checked whether the group address or the source group address of the received multicast data is in the specified forwarding range of the multicast data of the source VPN multicast instance, the isolation between the VPN multicast instances is ensured, the resource occupation of a router system is reduced, and the network load is alleviated.

Through the descriptions of the preceding embodiments, persons skilled in the art may understand that the present invention may be implemented by hardware only or by software plus a necessary universal hardware platform. However, in most cases, using software and a necessary universal hardware platform are preferred. Based on such understandings, all or part of the technical solutions under the present invention that makes contributions to the prior art may be essentially embodied in the form of a software product. The software product may be stored in a storage medium. The software product includes a number of instructions that enable a terminal device (mobile phone, personal computer, server, or network device) to execute the method provided in each embodiment of the present invention.

It should be noted that the above descriptions are merely preferred embodiments of the present invention, and person having ordinary skill in the art may make various improvements and refinements without departing from the spirit of the invention. All such modifications and refinements should also be intended to be covered by the present invention.

What is claimed is:

1. A method for extranet networking of a multicast Virtual Private Network (VPN), comprising:
    adding a Share-Group address of a source VPN to a source VPN multicast instance;
    adding the Share-Group address of the source VPN to a receiver VPN multicast instance;
    establishing a multicast tunnel between the receiver VPN multicast instance and the source VPN multicast instance, wherein a multicast tunnel interface (MTI) is connected to the multicast tunnel according to the Share-Group address of the source VPN;
    sending, from the receiver VPN multicast instance, an encapsulated Protocol Independent Multicast (PIM) protocol message to the MTI;
    forwarding the encapsulated PIM protocol message in a public network to the source VPN multicast instance;
    generating, by the source VPN multicast instance, a public network multicast data message of a Share-Group of the source VPN according to the encapsulated PIM protocol message;
    decapsulating, by the receiver VPN multicast instance, the received public network multicast data message of the Share-Group of the source VPN; and
    obtaining, by the receiver VPN multicast instance, multicast data from the source VPN multicast instance;
    wherein when both the receiver VPN multicast instance and the source VPN multicast instance operate in a PIM Sparse Mode (SM), setting a specified forwarding range of the multicast data of the source VPN multicast instance to a private network group address range; and
    wherein when both the receiver VPN multicast instance and the source VPN multicast instance operate in a PIM Source Specific Multicast (SSM), setting the specified forwarding range of the multicast data of the source VPN multicast instance to a private network source group address range.

2. The method according to claim 1, wherein after the adding the Share-Group address to the receiver VPN multicast instance, the method further comprises:
    checking whether a group address or a source group address of the multicast data is in the specified forwarding range of the multicast data of the source VPN multicast instance; and
    when the group address or the source group address of the multicast data is in the specified forwarding range of the multicast data of the source VPN multicast instance, forwarding the multicast data according to receiver VPN multicast routing.

3. The method according to claim 2, further comprising:
    when the group address or the source group address of the multicast data is not in the specified forwarding range of the multicast data of the source VPN multicast instance, discarding the multicast data.

4. The method according to claim 1, wherein before the sending the encapsulated PIM protocol message to the MTI, the method further comprises:
    determining the MTI to which the PIM protocol message is sent according to a private network group address or a source group address.

5. The method according to claim 1, wherein sending, from the receiver VPN multicast instance, an encapsulated Protocol Independent Multicast (PIM) protocol message to the MTI, forwarding the encapsulated PIM protocol message in a public network to the source VPN multicast instance, and making generating, by the source VPN multicast instance, generate a public network multicast data message of a Share-Group of the source VPN according to the encapsulated PIM protocol message comprises:
    encapsulating the PIM protocol message according to the MTI to generate the encapsulated PIM protocol message;
    forwarding the encapsulated PIM protocol message to the source VPN multicast instance through the public network, so as to make the source VPN multicast instance decapsulate the received encapsulated PIM protocol message to obtain the PIM protocol message, and encapsulating the multicast data of the source VPN multicast instance according to the PIM protocol message; and receiving the public network multicast data message of the Share-Group of the source VPN multicast instance, wherein the public network multicast data message is generated by encapsulating the multicast data according to the PIM protocol message.

6. A system for extranet networking of a multicast Virtual Private Network (VPN), comprising:
 a source VPN, configured to add a Share-Group address of the source VPN to a source VPN multicast instance; and
 a receiver VPN, configured to:
  add the Share-Group address of the source VPN to a receiver VPN multicast instance,
  establish a multicast tunnel between the receiver VPN multicast instance and the source VPN multicast instance, wherein a multicast tunnel interface (MTI) is connected to the multicast tunnel according to the Share-Group address of the source VPN,
  send an encapsulated Protocol Independent Multicast (PIM) protocol message to the MTI,
  forward the encapsulated PIM protocol message in a public network,
  cause the source VPN multicast instance to generate a public network multicast data message of a Share-Group of the source VPN according to the encapsulated PIM protocol message,
  decapsulate the received public network multicast data message of the Share-Group of the source VPN, and
  obtain multicast data from the source VPN multicast instance;
 wherein when both the receiver VPN multicast instance and the source VPN multicast instance operate in a PIM Sparse Mode (SM), the receiver VPN is further configured to set a specified forwarding range of the multicast data of the source VPN multicast instance to a private network group address range; and
 wherein when both the receiver VPN multicast instance and the source VPN multicast instance operate in a PIM Source Specific Multicast (SSM), the receiver VPN is further configured to set the specified forwarding range of the multicast data of the source VPN multicast instance to a private network source group address range.

7. The system for extranet networking of a multicast VPN according to claim 6, wherein the receiver VPN is further configured to:
 check whether a group address or a source group address of the multicast data is in the specified forwarding range of the multicast data of the source VPN multicast instance; and
 forward the multicast data according to receiver VPN multicast routing when the group address or the source group address of the multicast data is in the specified forwarding range of the multicast data of the source VPN multicast instance.

8. The system for extranet networking of a multicast VPN according to claim 7, wherein the receiver VPN is further configured to discard the multicast data when the group address or the source group address of the multicast data is not in the specified forwarding range of the multicast data of the source VPN multicast instance.

9. The system for extranet networking of a multicast VPN according to claim 6, wherein the receiver VPN is further configured to determine the MTI to which the PIM protocol message is sent according to a private network group address or a source group address before sending the encapsulated PIM protocol message to the MTI.

10. A receiver Virtual Private Network (VPN) multicast instance comprising a processing unit and computer readable media configured with computer executable instructions executed by the processing unit, the processing unit comprising:
 an establishing module, configured to establish a multicast tunnel between the receiver VPN multicast instance and a source VPN multicast instance, wherein a Share-Group address of the source VPN is added to each of the source VPN multicast instance and the receiver VPN multicast instance, wherein a multicast tunnel interface (MTI) is connected to the multicast tunnel according to the Share-Group address of the source VPN;
 a sending module, configured to send an encapsulated Protocol Independent Multicast (PIM) protocol message to the MTI established by the establishing module, forward the encapsulated PIM protocol message in a public network, and cause the source VPN multicast instance to generate a public network multicast data message of a Share-Group of the source VPN according to the encapsulated PIM protocol message;
 an obtaining module, configured to decapsulate the received public network multicast data message of the Share-Group of the source VPN, and obtain multicast data from the source VPN multicast instance; and
 a specifying module configured to:
  set a specified forwarding range of the multicast data of the source VPN multicast instance to a private network group address range when both the receiver VPN multicast instance and the source VPN multicast instance operate in a PIM Sparse Mode (SM); and
  set the specified forwarding range of the multicast data of the source VPN multicast instance to a private network source group address range when both the receiver VPN multicast instance and the source VPN multicast instance operate in a PIM Source Specific Multicast (SSM).

11. The receiver VPN multicast instance according to claim 10, the processing unit further comprising:
 a checking module, configured to check whether a group address or a source group address of the multicast data obtained by the obtaining module is in the specified forwarding range of the multicast data of the source VPN multicast instance; and
 a forwarding module, configured to forward the multicast data according to receiver VPN multicast routing when the checking module checks that the group address or the source group address of the multicast data is in the specified forwarding range of the multicast data of the source VPN multicast instance.

12. The receiver VPN multicast instance according to claim 11, the processing unit further comprising:
 a discarding module, configured to discard the multicast data when the checking module checks that the group address or the source group address of the multicast data is not in the specified forwarding range of the multicast data of the source VPN multicast instance.

13. The receiver VPN multicast instance according to claim 10, the processing unit further comprising:
 a determining module, configured to determine the MTI to which the sending module sends the PIM protocol message according to a private network group address or a source group address.

* * * * *